United States Patent [19]
Garnjost et al.

[11] Patent Number: 5,347,884
[45] Date of Patent: Sep. 20, 1994

[54] METHOD AND APPARATUS FOR CANCELLATION OF ROTATIONAL UNBALANCE

[75] Inventors: Kenneth D. Garnjost, Buffalo; Gonzalo J. Rey, Batavia, both of N.Y.

[73] Assignee: Moog Inc., East Aurora, N.Y.

[21] Appl. No.: 27,809

[22] Filed: Mar. 8, 1993

[51] Int. Cl.[5] .................... F16F 15/20; F16F 15/22
[52] U.S. Cl. ......................... 74/573; 29/901; 74/574; 248/554; 248/638
[58] Field of Search ............... 74/573, 574; 29/901; 248/554, 638

[56] References Cited

U.S. PATENT DOCUMENTS

| | | | |
|---|---|---|---|
| 3,158,038 | 11/1964 | Goodman | 74/573 |
| 4,819,182 | 4/1989 | King et al. | 248/566 X |
| 5,005,439 | 4/1991 | Jensen et al. | 74/574 |
| 5,092,195 | 3/1992 | Parsons | 74/573 R |

*Primary Examiner*—Allan D. Herrmann
*Attorney, Agent, or Firm*—Sommer, Oliverio & Sommer

[57] ABSTRACT

A device (19) for generating a rotating force vector and an oscillatory couple includes a plurality of non-concentric eccentric masses (22A, 22B, 22C, 22D, 22E, 22F) co-rotating at the same angular speed; and means (24A, 24B, 24C, 24D, 24E, 24F) for individually controlling the angular position of each of the masses; whereby, by selectively controlling the angular position of each eccentric mass, the device may generate a desired rotating force vector and a desired oscillatory couple. In use, the device performs an improved method for opposing the propagation of vibration from a dynamically unbalanced rotating rotor through a supporting structure (12). This method comprises the steps of: mounting a plurality of non-concentric rotatable eccentric masses on the supporting structure; co-rotating each eccentric mass at the same angular speed as the rotor, and controlling the angular position of each mass relative to the angular position of the rotor; thereby to generate a pattern of rotating inertial forces to oppose the transmission of vibration from the rotor through the supporting structure.

9 Claims, 2 Drawing Sheets

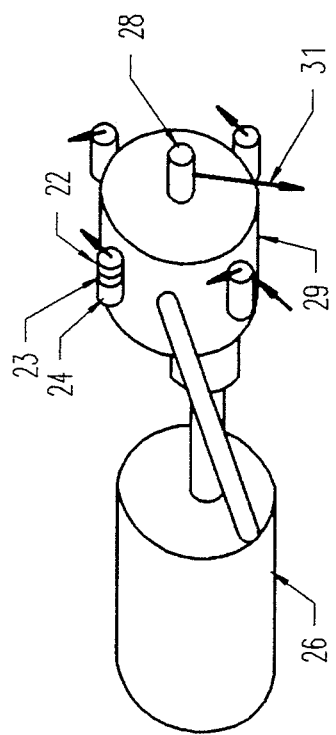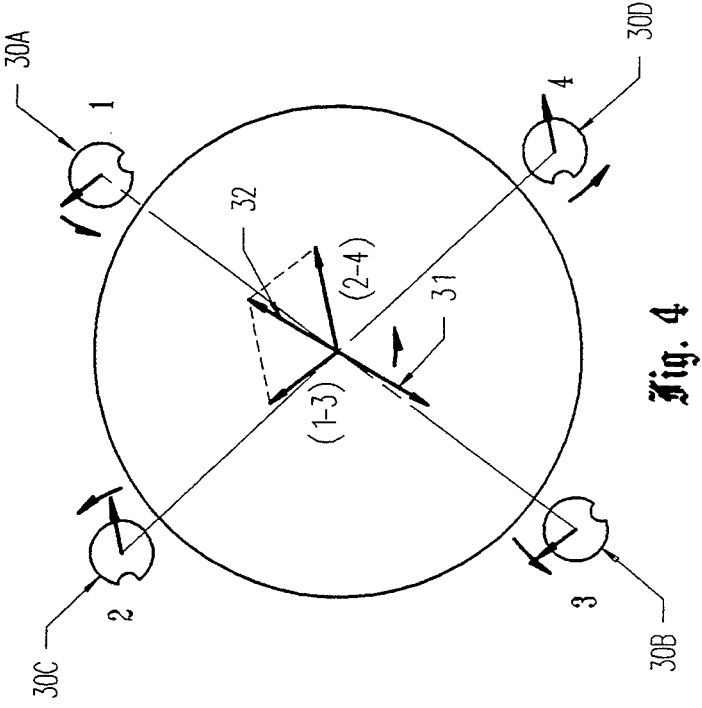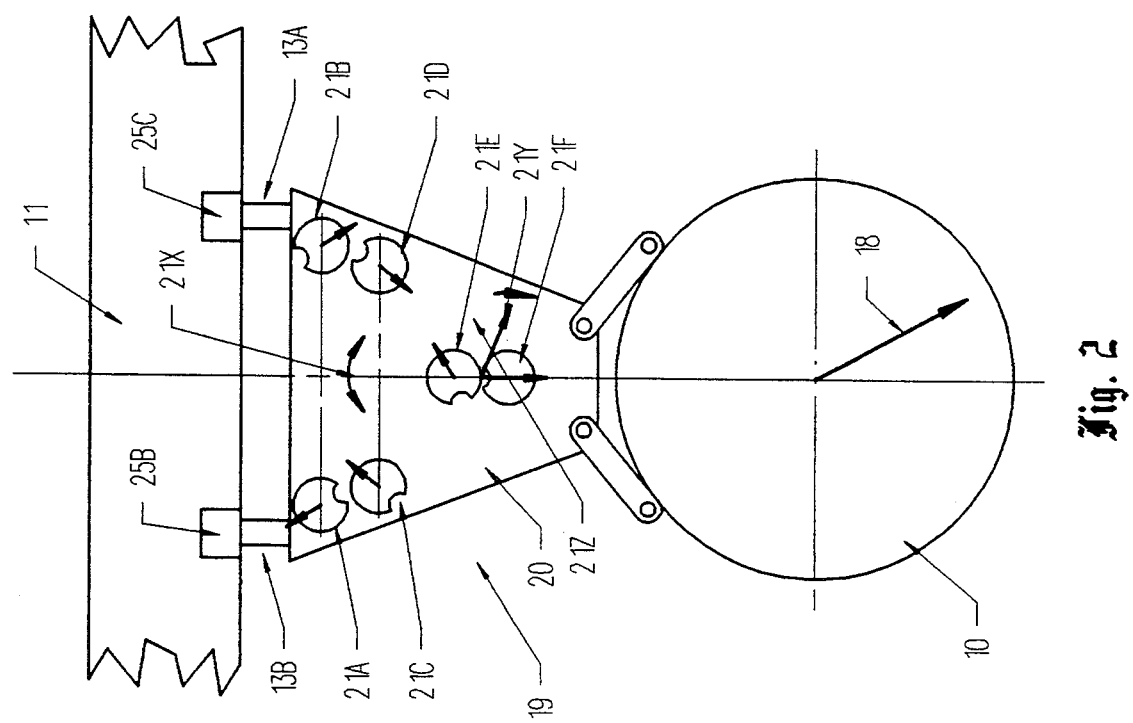

METHOD AND APPARATUS FOR CANCELLATION OF ROTATIONAL UNBALANCE

TECHNICAL FIELD

This invention relates generally to the field of force and couple generators, and, more particularly, to an improved rotating force and couple generator and to an improved method of opposing the propagation of vibration from a dynamically-unbalanced rotating rotor through a supporting structure.

BACKGROUND ART

To date, suppression of aircraft turbo-fan engine vibration has utilized hydraulically-powered oscillating-mass linear force generators mounted orthogonally on the engine strut bulkhead which carries the aft engine mount. While this technique has proven effective and has the potential for reducing forces at multiple frequencies, problems have developed with respect to waveform fidelity (e.g., the generation of unwanted harmonics). Moreover, this form uses significant hydraulic power.

The use of geared counter-rotating eccentric masses to generate an oscillatory force has been known. This type of device has been applied to apparatus such as conveyer shakers and vibration testers. Further, adjustable differential gearing has been used to vary the phase relationship of two summed oscillatory forces to control the effective amplitude of the resultant force. U.S. Pat. No. 5,005,439 shows a logical extension of this type of device, combined with state-of-the-art motor control techniques, to provide four independently-controlled concentric co-planar nested rotating masses capable of generating a variable-amplitude adjustable-angle oscillatory force at a single point. A rotating eccentric mass force generator has the fundamental advantages of producing a pure sinusoidal source (albeit at a single frequency), and requires only enough power to overcome bearing friction, thus making electric motor drive practical. However, the device as shown in said U.S. Pat. No. 5,005,439 appears to be mechanically complex and awkward to package. While the generated force is equivalent to a pair of orthogonal hydraulic linear force generators acting at a single point, it is believed that the desired counter-vibration pattern required to cancel engine vibrations is necessarily more complex.

DISCLOSURE OF THE INVENTION

In one aspect, the present invention provides a device for generating a rotating force vector and an oscillatory couple. This device broadly includes a plurality of non-concentric eccentric masses co-rotating at the same angular speed; and means for individually controlling the angular position of each of the masses; whereby, by selectively controlling the angular position of each eccentric mass, the device may generate a desired rotating force vector and a desired oscillatory couple.

In another aspect, the invention provides an improved method for opposing the propagation of vibration from a dynamically unbalanced rotating rotor through a supporting structure, which method comprises the steps of: mounting a plurality of nonconcentric rotatable eccentric masses on the supporting structure; co-rotating each of the eccentric masses at the same angular speed as the rotor; and controlling the angular position of each of the masses relative to the angular position of the rotor; thereby to generate a pattern of rotating inertial forces to oppose the transmission of vibration from the rotor through the supporting structure.

Accordingly, the general object of this invention is to provide an improved device for generating a rotating force vector and an oscillatory couple.

Another object is to provide an improved method for opposing the propagation of vibration from a dynamically unbalanced rotating rotor, such as an engine, through a supporting structure.

These and other objects and advantages will become apparent from the foregoing and ongoing written specification, the drawings and the appended claims.

BRIEF DESCRIPTION OF THE DRAWINGS

FIG. 2 is a fragmentary transverse vertical sectional view thereof, taken generally on line 2—2 of FIG. 1 showing three pairs of eccentric co-rotating masses mounted on the strut.

FIG. 3 is a perspective schematic view of a turboprop propeller unbalance vibration suppressor incorporating the present invention.

FIG. 4 is a schematic front outline view of the device shown in FIG. 3.

DESCRIPTION OF THE PREFERRED EMBODIMENTS

Figure 1:
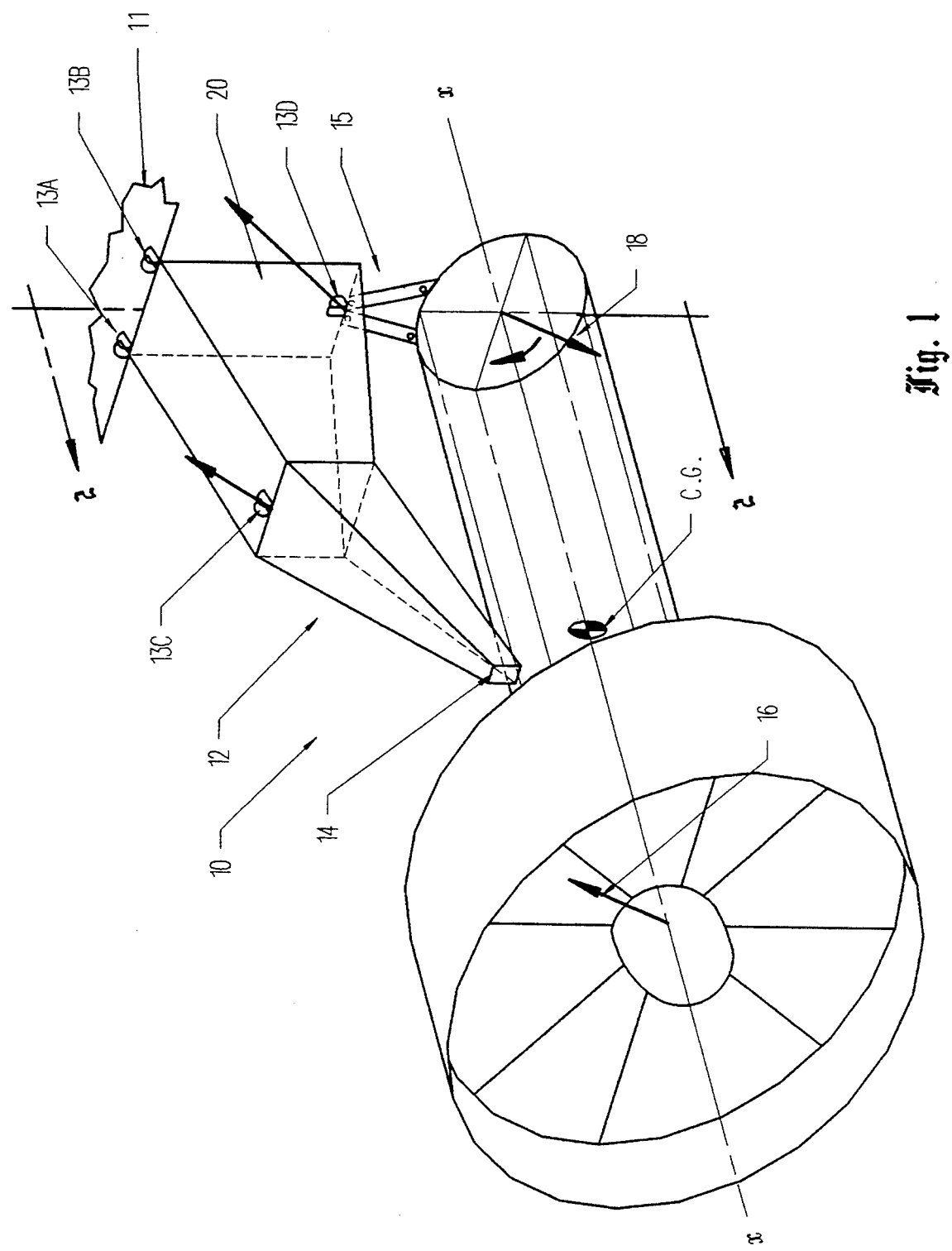
FIG. 1 is a perspective schematic view of a jet engine supported by a strut beneath an aircraft wing.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

Turning now to the drawings, and, more particularly, to FIG. 1 thereof, this invention broadly provides an improved device for selectively generating a rotating force vector and an oscillatory couple. The principal purpose of this device is to oppose the propagation of vibrations, typically attributable to a rotating unbalance force vector from one structure to another.

FIG. 1 depicts a jet engine 10 as being supported beneath an aircraft wing, fragmentarily illustrated at 11, by a strut 12. The strut has four spaced clevis-like connections, severally indicated at 13A, 13B, 13C and 13D, respectively, with the wing, and has fore and aft connections 14, 15, respectively, with the engine. Assume that an unbalance in the fan section of the engine creates a rotating force vector 16. This vector will rotate at the angular speed of the engine about the longitudinal axis (x—x) of same. If the forward mount 14 is located proximate the center of gravity ("C. G.") of the engine, then disturbance vector 16 will produce a significant oppositely-directed rotating vector 18 adjacent the aft mount. The magnitude of rear vector 18 will be a function of vector 16 and the ratio of the axial distances of vectors 16, 18 from the center of gravity. Unless opposed, this rear vector 18 will be transmitted through the strut to the wing.

FIG. 2 depicts a schematic form of the device, generally indicated at 19, as being mounted on the rear vertical surface 20 of strut 12 so as to generate suitable forces to cancel the propagation of vibration from the engine through the strut to the wing. The rotating force vector 18 will generate reaction forces at the wing attach clevises 13A and 13B, which appear as equivalent rotating vectors plus an oscillating couple. To effectively cancel these forces, it is necessary to provide a device which can generate an equivalent force pattern at the wing-attach devises. A single oscillating vector, such as would be generated by a pair of orthogonal linear vibrators or the mechanism shown in U.S. Pat. No. 5,005,439, cannot provide such an equivalent force pattern. The required cancelling force pattern-acting on surface 20 takes the form of a rotating vector and an oscillating couple.

The present invention provides a novel mechanism to generate such a dynamic force pattern. The improved device has six identical modules or units, severally indicated at 21A through 21F which may be arranged in groups of three pairs. The modules of the upper horizontally-spaced pair are indicated at 21A and 21B, the modules of the intermediate horizontally-spaced pair are indicated at 21C and 21D, and the modules of the lower vertically-spaced pair are indicated at 21E and 21F. Each module or unit has an eccentric mass 22, a motor 23 (FIG. 3) arranged to rotate the associated mass in the same direction and at the same speed as the engine, and means 24 (e.g., a resolver) for individually determining and controlling the angular position of the associated mass relative to the angular position of the engine.

The two eccentric masses of the uppermost horizontal pair 21A, 21B are held at 180° relative to one another, and will together generate a constant amplitude oscillatory couple at any given frequency, since their horizontal components will always cancel out. The rotors of the intermediate horizontal pair 21C, 21D are similarly rotated at 180° relative to one another, but at a variable phase angle with respect to the masses of the first pair. The sum of the out-of-phase couples thus generated will be a controllable-amplitude oscillating couple, indicated at 21X. The lower vertical pair 21E, 21F generates a rotating vector, indicated at 21Y, of varying magnitude depending upon the relative phase of the masses of this pair, plus a small oscillatory couple 21Z because their masses are not concentric. However, this undesired couple can be compensated for by adjusting the relative phase of the two horizontal pairs.

The forces generated by this arrangement can be controlled to achieve vibration suppression by various known adaptive control techniques, such as shown and described in U.S. Pat. No. 4,819,182. Accelerometers, such as indicated at 25B and 25C in FIG. 2 measuring the amplitude and phase of the structural vibration at the strut-to-wing clevis attachments (or in the aircraft cabin) can be used to optimally adjust four rotating mass control parameters, namely, the absolute phase of each of the eccentric masses 21E and 21F, and the eccentric mass pairs 21A-21B.

The general method described above can be simplified to a special case if the major unbalanced force vector rotates in a single plane, and if it is practical to mount four concentric modules close to that plane in diametrically-opposite pairs centered about the axis of the unbalanced rotor. An example of his would be propeller unbalance on a turbo-prop engine installation, where the eccentric weight rotors could be clustered around the propeller drive gear box, close to the plane of the propeller. Such an arrangement is shown in FIG. 3, in which a turbine engine 26 is arranged to rotate an output shaft 28 through a intermediate gear box 29. FIGS. 3 and 4 depict four modules surrounding this gear box and concentric with the axis of shaft 28. These modules are severally indicated at 30A through 30D. These modules are arranged in diametrically-opposite paris, with modules 30A, 30B forming one pair and modules 30C, 30D forming the other. The eccentric masses in each pair are rotated in phase with one another. The summed parallel rotating vector forces generated by rotors 30A and 30B can then be considered as acting at the shaft axis, and sum with similar forces generated by rotors 30C and 30D. It can be seen that the phase angles of each of these can be adjusted to produce a rotating vector sum 32 which can just cancel the unbalance rotating force vector 31.

The control parameters can be considered to be the absolute phase angle of the summed vector force, and the leading and lagging relative phase angles of the components which establishes the magnitude of that sum. These two variables can be directly controlled to produce cancellation of the unbalance 31 by measuring the amplitude and phase of the output signal from a single suitably-placed accelerometer (not shown) measuring engine radial vibration at one arbitrarily-selected angle, assuming that the horizontal and vertical effects from a rotating vector unbalance force are identical.

Thus, in use, the improved device provides an improved method of opposing the propagation of vibration from a dynamically-unbalanced rotating rotor (e.g., the turbine of a jet engine) through a supporting structure (e.g., a strut), comprising the steps of: mounting a plurality of non-concentric rotatable eccentric masses on the supporting structure; co-rotating each of the eccentric masses at the same angular speed as the rotor; and controlling the angular position of each of the masses relative to the angular position of the rotor; thereby to generate a pattern of rotating inertial forces to oppose the transmission of vibration from said rotor through said supporting structure.

Modifications

The present invention contemplates that many changes and modifications may be made. For example, while it is presently preferred to rotate the eccentric masses by means of an electric motor, other types of motors might readily be substituted therefor. Similarly, while the angular positions of the various eccentric masses may be determined and monitored by means of resolvers, other types of mechanisms might be substituted therefor.

Therefore, while two preferred embodiments of the improved device have been shown and described, and several modifications thereof discussed, persons skilled in this art will readily appreciate that various additional changes and modifications may be made without departing from the spirit of the invention, as defined and differentiated by the following claims.

What is claimed is:

1. A device for generating a rotating force vector and an oscillatory couple, comprising:
   a plurality of non-concentric eccentric masses co-rotating at the same angular speed;
   means for individually controlling the angular position of each of said masses;
   said plurality including a first pair of masses, the relative angular position of the masses of said first pair being maintained 180° apart; and
   said plurality including a second pair of masses, the relative angular position of the masses of said second pair being controlled to produce an adjustable-amplitude rotating force vector such that by selectively controlling the angular position of each eccentric mass, said device will generate a desired rotating force vector and a desired oscillatory couple.

2. A device as set forth in claim 1 wherein said masses are substantially co-planar.

3. A device as set forth in claim 1 wherein said masses are arranged to co-rotate about substantially parallel axes.

4. A device as set forth in claim 1 wherein said plurality includes at least six of said masses.

5. A device as set forth in claim 1 wherein the mass eccentricity of said masses is substantially the same.

6. A device as set forth in claim 5 wherein either the mass or its distance from the center of rotation is substantially the same.

7. A device as set forth in claim 1 and further comprising an electric motor for rotating each of said masses.

8. A method of opposing the propagation of vibration from a dynamically unbalanced rotating rotor, which reacts on a supporting structure with a rotating force vector and an oscillatory couple, comprising the steps of:
   mounting a plurality of non-concentric rotatable eccentric masses on said supporting structure;
   co-rotating each of said eccentric masses at the same angular speed as the rotor; and
   controlling the angular position of each of said masses relative to the angular position of said rotor so as to generate an opposing rotating force vector and an opposing oscillatory couple on said supporting structure.

9. A method as set forth in claim 8 wherein the step of controlling the angular position includes the further steps of:
   causing the relative angular position of the masses of a first pair of masses of said plurality to be maintained 180° apart; and
   controlling the relative angular position of the masses of a second pair of masses of said plurality to produce such adjustable-amplitude opposing force vector and such variable opposing couple.

* * * * *